US012798653B2

(12) United States Patent
Yi et al.

(10) Patent No.: US 12,798,653 B2
(45) Date of Patent: Nov. 17, 2026

(54) BABY STROLLER

(71) Applicant: Artsana S.p.A., Grandate CO (IT)

(72) Inventors: Liwei Yi, Zhongshan City (CN); Jiancheng Xiang, Zhongshan City (CN)

(73) Assignee: ARTSANA S.P.A., Grandate Co (IT)

( * ) Notice: Subject to any disclaimer, the term of this patent is extended or adjusted under 35 U.S.C. 154(b) by 283 days.

(21) Appl. No.: 18/664,396

(22) Filed: May 15, 2024

(65) Prior Publication Data

US 2024/0409144 A1 Dec. 12, 2024

(30) Foreign Application Priority Data

Jun. 7, 2023 (CN) ......................... 202321450272.2

(51) Int. Cl.
*B62B 7/08* (2006.01)
*B62B 7/14* (2006.01)

(52) U.S. Cl.
CPC . *B62B 7/08* (2013.01); *B62B 7/14* (2013.01)

(58) Field of Classification Search
CPC B62B 7/062; B62B 7/064; B62B 7/08; B62B 7/14
See application file for complete search history.

(56) References Cited

U.S. PATENT DOCUMENTS 6,095,548 A * 8/2000 Baechler ................. B62B 7/062 280/650
6,105,998 A * 8/2000 Baechler ................. B62B 7/062 280/47.38
8,276,935 B2 * 10/2012 Minato ................... B62B 9/085 280/47.38
8,408,580 B2 * 4/2013 Liao ........................ B62B 7/062 280/647
8,870,213 B1 * 10/2014 Xu ............................ B62B 7/08 280/647
8,905,428 B2 * 12/2014 Schroeder ................. B62B 7/08 280/650
8,961,057 B2 * 2/2015 Schroeder .............. F16C 11/10 280/647
8,991,854 B2 * 3/2015 Greger .................... B62B 3/022 280/650
9,044,104 B2 * 6/2015 Smith ....................... B62B 7/08
9,540,028 B2 * 1/2017 Taylor ....................... B62B 7/10
9,545,940 B2 * 1/2017 Taylor ..................... B62B 7/142
10,137,922 B2 * 11/2018 Yuan ......................... B62B 9/26
10,155,528 B2 * 12/2018 Zhong ..................... B62B 7/083
10,173,710 B1 * 1/2019 Cheng ..................... B62B 7/062
10,836,419 B2 * 11/2020 Oakes ....................... B62B 7/08

(Continued)

*Primary Examiner* — Jeffrey J Restifo
(74) *Attorney, Agent, or Firm* — RANKIN, HILL & CLARK LLP; Erik J. Overberger

(57) ABSTRACT

The invention discloses a baby stroller, including a foldable frame, wherein the frame is provided with a locking device for locking same in an unfolded state; the frame is connected with a seat assembly which is configured for a baby to sit when the baby stroller is in the unfolded state and is able to rotate relative to the frame and be closed and folded towards the frame when the baby stroller needs to be folded; and the seat assembly is provided with an unlocking part capable of driving the locking device to unlock when the seat assembly is rotated and folded relative to the frame. The invention has a simple structure and is convenient for operation.

9 Claims, 8 Drawing Sheets

(56) References Cited

U.S. PATENT DOCUMENTS

| | | | | |
|---|---|---|---|---|
| 11,390,311 | B2 * | 7/2022 | Horst | B62B 7/062 |
| 12,358,546 | B2 * | 7/2025 | Horst | B62B 7/062 |
| 12,594,979 | B2 * | 4/2026 | Longenecker | B62B 7/008 |
| 2007/0164538 | A1 * | 7/2007 | Yeh | B62B 7/08 280/642 |
| 2014/0044472 | A1 * | 2/2014 | Lin | B62B 7/08 403/92 |
| 2014/0334867 | A1 * | 11/2014 | Su | B62B 7/062 403/106 |
| 2022/0169297 | A1 * | 6/2022 | Pujol | B62B 7/062 |
| 2022/0348247 | A1 * | 11/2022 | Sun | B62B 7/062 |
| 2023/0159079 | A1 * | 5/2023 | Lawrence | B62B 7/145 280/642 |
| 2024/0278820 | A1 * | 8/2024 | Horst | B62B 9/12 |
| 2024/0409147 | A1 * | 12/2024 | Zhong | B62B 7/062 |

* cited by examiner

BABY STROLLER

TECHNICAL FIELD

The invention relates to a baby stroller.

BACKGROUND ART

Baby strollers are common products in the growth process of babies. Common baby strollers can generally be unfolded or folded. The baby stroller is convenient for storage or carrying in a folded state. At present, the baby strollers on the market all include a foldable frame and a seat assembly connected to the frame. When it is required to fold the baby stroller, the locking mechanism between the seat assembly and the frame is firstly unlocked, the seat assembly is allowed to rotate relative to the frame to be closed and folded towards the frame, and then the locking mechanism of the frame is operated to unlock and fold the frame. Therefore, when the baby stroller is folded, it is required to operate the locking mechanism twice to unlock the whole baby stroller, and the operation is relatively complicated.

Therefore, the invention appears based on the above-mentioned deficiencies.

SUMMARY OF THE INVENTION

The purpose of the invention is to overcome the deficiencies of the prior art and provide a baby stroller with a simple structure and convenient operation.

The invention is realized by a baby stroller according to the appended claims.

According to the invention, a baby stroller comprises a foldable frame 1, wherein the frame 1 is provided with a locking device 2 for locking same in an unfolded state; the frame 1 is connected with a seat assembly 3 which is configured for a baby to sit when the baby stroller is in the unfolded state and is able to rotate relative to the frame 1 and be closed and folded towards the frame 1 when the baby stroller needs to be folded; and the seat assembly 3 is provided with an unlocking part 4 capable of driving the locking device 2 to unlock when the seat assembly 3 is rotated and folded relative to the frame 1.

According to one embodiment, the frame 1 comprises a first support leg 11 and a second support leg 12 which have wheels 17 and can rotate relative to each other, wherein a connecting seat 13 is fixedly connected to an upper end of the first support leg 11; the second support leg 12 is rotatably connected to the connecting seat 13 about a first axis A; the connecting seat 13 is further rotatably connected to a push rod assembly 18 which can rotate to unfold or close relative to the first support leg 11 about a second axis B; the push rod assembly 18 and the second support leg 12 are further provided with a traction component 6 capable of pulling the second support leg 12 to rotate and close to the first support leg 11 when the locking device 2 is unlocked and the push rod assembly 18 is rotated and closed to the first support leg 11; the locking device 2 comprises a latching position 21 provided at a lower end of the push rod assembly 18 or an upper end of the second support leg 12; the connecting seat 13 is provided therein with a latching part 22 capable of sliding therein and engaging with or disengaging from the latching position 21; the latching part 22 is connected to a protrusion 23 which is exposed on the connecting seat 13 and can be pushed by the unlocking part 4 when the seat assembly 3 is rotated and closed relative to the frame 1; and a reset spring 24 is further provided between the latching part 22 and the connecting seat 13 to push the latching part 22 to slide and reset.

According to one embodiment, the traction component 6 comprises a traction rod 61, the lower end of which is rotatably connected to the upper end of the second support leg 12 about a third axis C at a position offset from the first axis A; and an upper end of the traction rod 61 is rotatably connected to the lower end of the push rod assembly 18 about a fourth axis D at a position offset from the second axis B.

According to one embodiment, the latching part 22 is provided with a strip-shaped groove 25; the protrusion 23 comprises a body 231 which is provided with a protruding block 232 exposed to the connecting seat 13; and the body 231 is provided with a pin shaft 233 which can move in the strip-shaped groove 25 and can cooperate with a groove wall of the strip-shaped groove 25 to push the latching part 22 to slide.

According to one embodiment, an auxiliary device is further provided between the upper end of the second support leg 12 and the connecting seat 13 for assisting in pushing the second support leg 12 to rotate and close to the first support leg 11 when the frame 1 is folded; the auxiliary device comprises an arc-shaped hole 81 provided at the upper end of the second support leg 12; a sliding block 82 capable of sliding therein is provided in the connecting seat 13; a pushing shaft 83 protruding into the arc-shaped hole 81 is provided on the sliding block 82; and a compression spring 84 is provided between the sliding block 82 and the connecting seat 13, which is compressed when the baby stroller is in the unfolded state and can push the sliding block 82 and then push the second support leg 12 to rotate via the push shaft 83 after the locking device 2 is unlocked.

According to one embodiment, the upper and lower ends of the traction rod 61 are respectively provided with a protruding shaft 62; and the connecting seat 13 is provided with a guide groove 14 for the protruding shaft 62 to pass through and control the movement track of the traction rod 61.

According to one embodiment, the lower end of the push rod assembly 18 is of a plate-shaped structure; the upper end of the second support leg 12 is of a plate-shaped structure; the connecting seat 13 is provided with an upper slot 15 for inserting the lower end of the push rod assembly 18; and the connecting seat 13 is further provided with a lower slot 16 for inserting the upper end of the second support leg 12.

According to one embodiment, the unlocking part 4 comprises a side projection 41 protruding from the side of the seat assembly 3, wherein the side projection 41 has a lower side 42 capable of pushing the protrusion 23 to disengage the latching part 22 from the latching position 21 when the seat assembly 3 is rotated and folded relative to the frame 1; and the side projection 41 is further provided with a avoiding part 43 for avoiding the protrusion 23 when the seat assembly 3 is rotationally unfolded relative to the frame 1.

According to one embodiment, the side projection 41 is slidably connected to the seat assembly 3 so as to be able to move laterally with respect to the seat assembly 3; the avoiding part 43 is provided with a slope **43*a* on the side projection 41 and able to abut against and cooperate with a side end of the protrusion 23; and a reset element 44 is provided between the side projection 41 and the seat assembly 3 and able to be laterally compressed by the side projection 41 when the slope 43*a* abuts against the side of the protrusion 23**.

According to one embodiment, the push rod assembly 18 comprises a lower push rod 181 connected to the connecting seat 13; the lower push rod 181 is provided with a hand push rod 182 capable of sliding and being telescopic relative thereto; and the center of gravity of the push rod assembly 18 is set in a position where the push rod assembly 18 can automatically rotate relative to the first support leg 11 by means of the gravity of the push rod assembly 18 when the locking device 2 is unlocked.

Compared with the prior art, the invention has the following advantages:

When the baby stroller of the invention needs to be folded, the seat assembly is rotated relative to the frame to be closed and folded towards the frame. During the rotation of the seat assembly, the unlocking part on the seat assembly drives the locking device of the frame to unlock, so as to unlock the frame. That is, when the seat assembly is operated to rotate, the frame can be unlocked in linkage, so that the unlocking operation of the whole baby stroller is simple and the baby stroller can be folded conveniently and quickly.

During the rotation and folding of the seat assembly relative to the frame in the invention, the unlocking part on the seat assembly will push the protrusion to move, the protrusion will drive the latching part to slide relative to the connecting seat, and the latching part will exit from the latching position. At this time, the frame will be unlocked. Therefore, during the rotation of the seat assembly, the frame is unlocked, and it is no longer necessary to separately operate the frame locking device to unlock, so that the baby stroller is folded conveniently and quickly.

The frame of the invention includes a first support leg and a second support leg. A push rod assembly is rotatably connected to a connecting seat at an upper end of the first support leg about a first axis and a second axis. A traction rod is provided between the second support leg and the push rod assembly. A lower end of the traction rod is rotatably connected to the second support leg about a third axis and deviates from the first axis of rotation. An upper end of the traction rod is rotatably connected to the push rod assembly about a fourth axis and deviates from the second axis of rotation. Therefore, when the push rod assembly is rotationally close with respect to the first support leg, the traction rod pulls the second support leg to be rotated and closed towards the first support leg so as to achieve the folding of the frame. In addition, the traction rod is received inside the connecting seat, so that the whole baby stroller can be folded flexibly and has a simple and compact structure.

DETAILED DESCRIPTION

Figure 1:
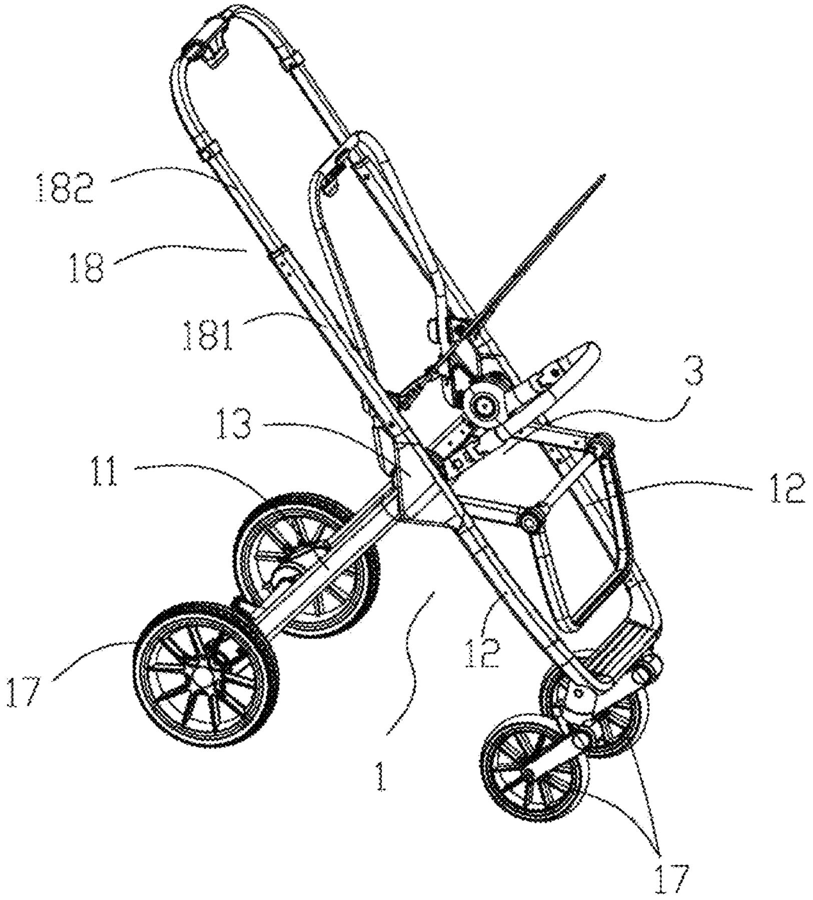
FIG. 1 is a perspective view of the invention.
Figure 2:
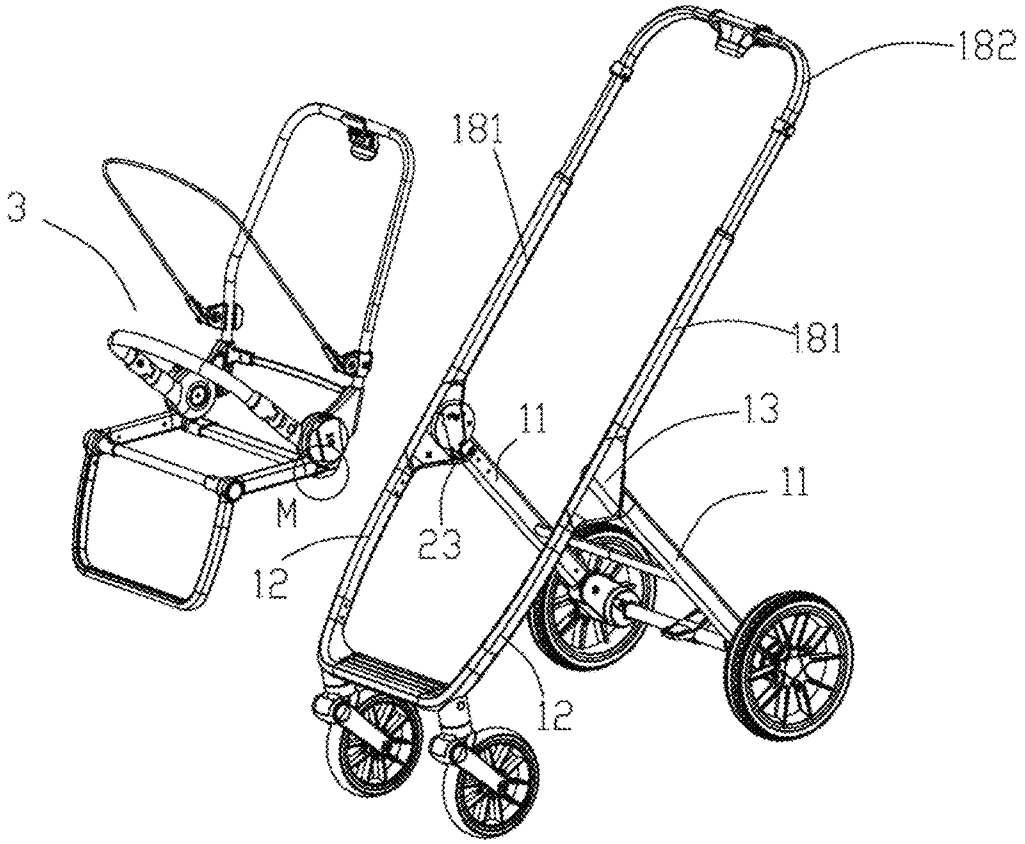
FIG. 2 is an explosive view of the invention.

The invention will be further described with reference to the drawings below.

As shown in FIGS. 1 to 8, a baby stroller includes a foldable frame 1. The frame 1 is provided with a locking device 2 for locking same in an unfolded state. The frame 1 is connected with a seat assembly 3 which is configured for a baby to sit when the baby stroller is in the unfolded state and is able to rotate relative to the frame 1 and be closed and folded towards the frame 1 when the baby stroller needs to be folded. The seat assembly 3 is provided with an unlocking part 4 capable of driving the locking device 2 to unlock when the seat assembly 3 is rotated and folded relative to the frame 1. When the baby stroller needs to be folded, the seat assembly 3 is rotated relative to the frame 1 to be closed and folded towards the frame 1. During the rotation of the seat assembly 3, the unlocking part 4 on the seat assembly 3 drives the locking device 2 of the frame 1 to unlock, so as to achieve the unlocking of the frame 1. That is, when the seat assembly 3 is operated to rotate, the frame 1 can be unlocked in linkage, so that the unlocking operation of the whole baby stroller is simple and the baby stroller is folded conveniently and quickly.

As shown in FIGS. 4 to 9, the frame 1 includes a first support leg 11 and a second support leg 12 which have wheels 17 and can rotate relative to each other. A connecting seat 13 is fixedly connected to an upper end of the first support leg 11. The second support leg 12 is rotatably connected to the connecting seat 13 about a first axis A. The connecting seat 13 is further rotatably connected to a push rod assembly 18 which can rotate to unfold or close relative to the first support leg 11 about a second axis B. The push rod assembly 18 and the second support leg 12 are further provided with a traction component 6 capable of pulling the second support leg 12 to rotate and close to the first support leg 11 when the locking device 2 is unlocked and the push rod assembly 18 is rotated and closed to the first support leg 11. The locking device 2 includes a latching position 21 provided at a lower end of the push rod assembly 18 or an upper end of the second support leg 12. The connecting seat 13 is provided therein with a latching part 22 capable of sliding therein and engaging with or disengaging from the latching position 21. The latching part 22 is connected to a protrusion 23 which is exposed on the connecting seat 13 and can be pushed by the unlocking part 4 when the seat assembly 3 is rotated and closed relative to the frame 1. A reset spring 24 is further provided between the latching part 22 and the connecting seat 13 to push the latching part 22 to slide and reset. During the rotation and folding process of the seat assembly 3 relative to the frame in the invention, the unlocking part 4 on the seat assembly will push the protrusion 23 to move, the protrusion 23 will drive the latching part 22 to slide relative to the connecting seat 13, and the latching part 22 will exit from the latching position 21. At this time, the frame 1 will be unlocked. Therefore, during the rotation of the seat assembly 3, the frame 1 is unlocked, and it is no longer necessary to separately operate the frame 1 locking device to unlock, so that the baby stroller is folded conveniently and quickly.

As shown in FIGS. 7 to 10, the traction component 6 includes a traction rod 61, the lower end of which is rotatably connected to the upper end of the second support leg 12 about a third axis C at a position offset from the first axis A. An upper end of the traction rod 61 is rotatably connected to the lower end of the push rod assembly 18 about a fourth axis D at a position offset from the second axis B. Therefore, when the push rod assembly 18 is rotated and close with relative to the first support leg 11, the traction rod 61 pulls the second support leg 12 to be rotated and closed towards the first support leg 11, so that the folding of the frame 1 is achieved, and the traction rod 61 is received inside the connecting seat 13. Thus, the whole baby stroller can be flexibly folded, and has a simple and compact structure.

Figure 9:
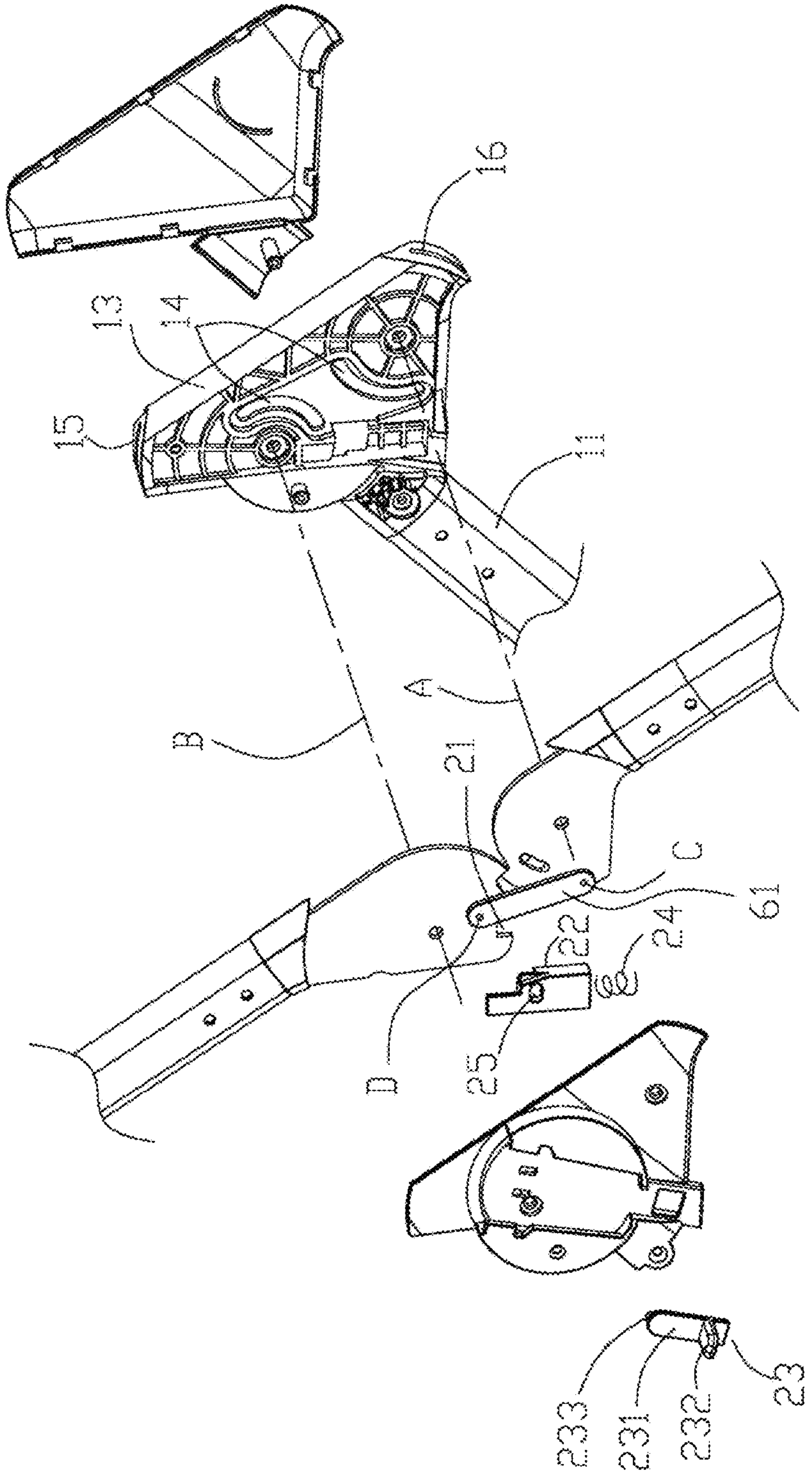
FIG. 9 is an exploded view II of components of the invention.

As shown in FIG. 9, the latching part 22 is provided with a strip-shaped groove 25. The protrusion 23 includes a body 231 which is provided with a protruding block 232 exposed on the connecting seat 13. The body 231 is provided with a pin shaft 233 which can move in the strip-shaped groove 25 and can cooperate with a groove wall of the strip-shaped groove 25 to push the latching part 22 to slide. The pin shaft 233 protrudes into the strip-shaped groove 25. Therefore, when the protrusion 23 is pushed and moved by the unlocking part 4, the latching part 22 is moved by applying a force to the groove wall of the strip-shaped groove 25 by the pin shaft 233. By the movement of the pin shaft 233 in the strip-shaped groove 25, the movement track of the latching part 22 and the movement track of the protrusion 23 may satisfy the normal unlocking of the locking device 2 on the basis of being non-parallel, thereby satisfying the purpose of compactness and flexible folding of the baby stroller.

Figure 8:
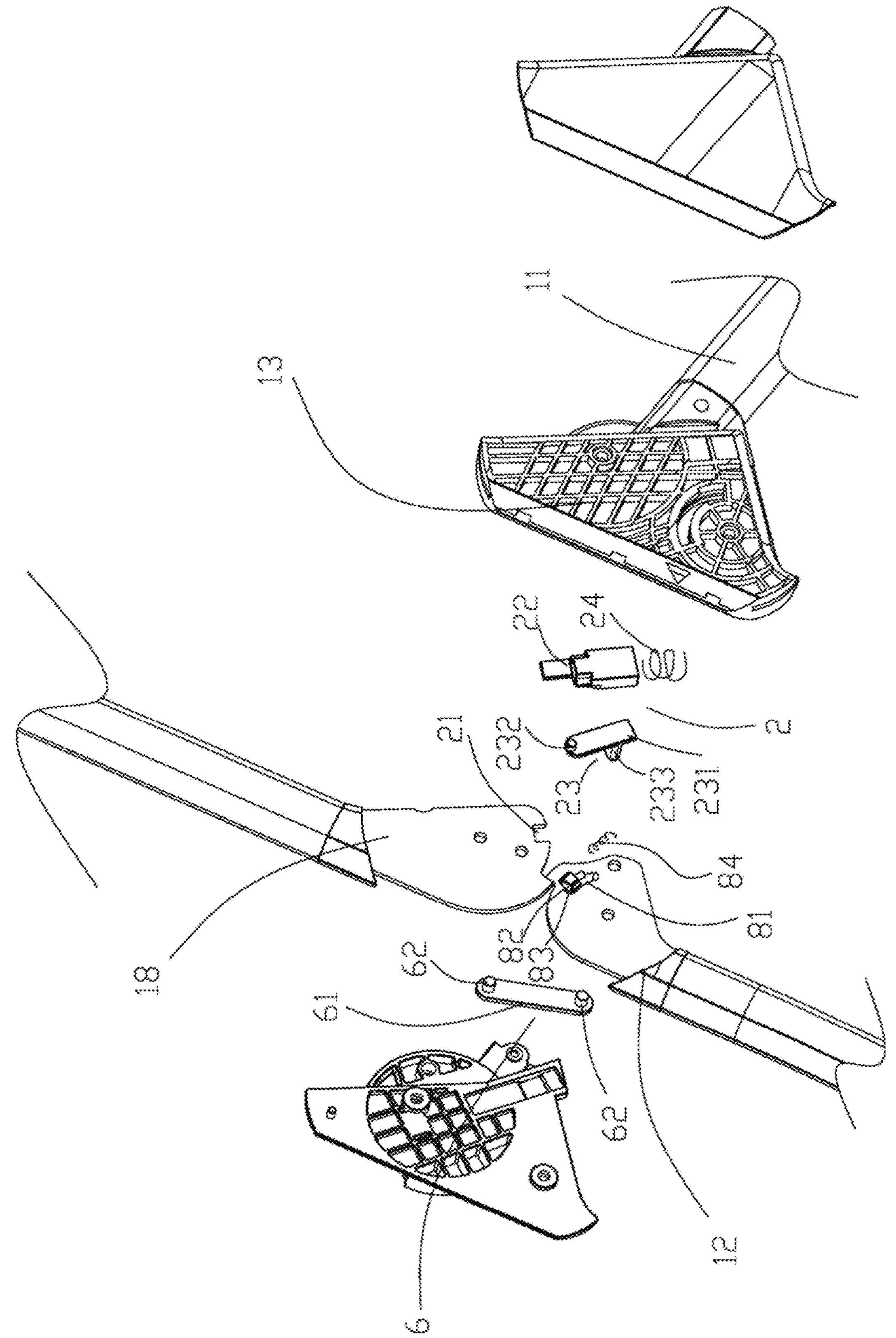
FIG. 8 is an exploded view I of components of the invention.
Figure 10:
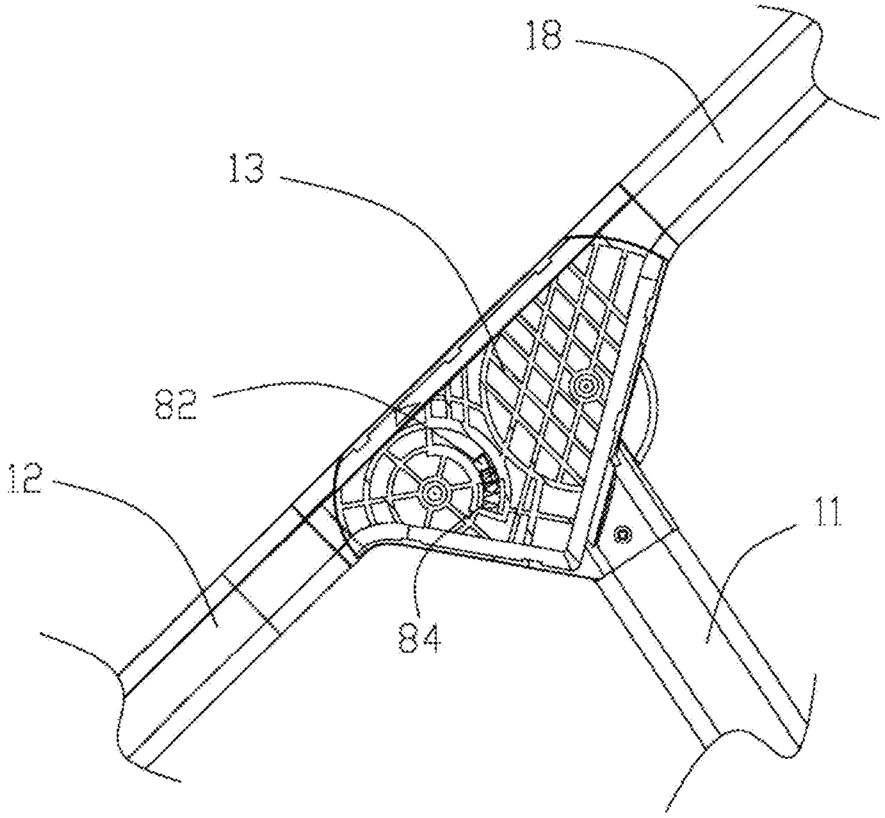
FIG. 10 is a perspective view of components of the invention.

As shown in FIGS. 8, 9 and 10, an auxiliary device is further provided between the upper end of the second support leg 12 and the connecting seat 13 for assisting in pushing the second support leg 12 to rotate and close to the first support leg 11 when the frame 1 is folded; the auxiliary device includes an arc-shaped hole 81 provided at the upper end of the second support leg 12; a sliding block 82 capable of sliding therein is provided in the connecting seat 13; a pushing shaft 83 protruding into the arc-shaped hole 81 is provided on the sliding block 82; and a compression spring 84 is provided between the sliding block 82 and the connecting seat 13, which is compressed when the baby stroller is in the unfolded state and can push the sliding block 82 and then push the second support leg 12 to rotate via the push shaft 83 after the locking device 2 is unlocked. When the baby stroller is in a unfolded state, the compression spring 84 is in a compressed state. When the locking device 2 is unlocked, the compression spring 84 will extend. The sliding block 82 slides, and the pushing shaft 83 on the sliding block 82 pushes an end of the arc-shaped hole 81, so as to exert an auxiliary force on the rotation of the second support leg 2 relative to the first support leg 11. Thus, the frame 1 is smoothly and flexibly folded.

As shown in FIG. 9, the upper and lower ends of the traction rod 61 are respectively provided with a protruding shaft 62; and the connecting seat 13 is provided with a guide groove 14 for the protruding shaft 62 to pass through and control the movement track of the traction rod 61, so that the frame can be flexibly and smoothly folded. The lower end of the push rod assembly 18 is of a plate-shaped structure; the upper end of the second support leg 12 is of a plate-shaped structure; the connecting seat 13 is provided with an upper slot 15 for inserting the lower end of the push rod assembly 18; and the connecting seat 13 is further provided with a lower slot 16 for inserting the upper end of the second support leg 12.

Figure 3:
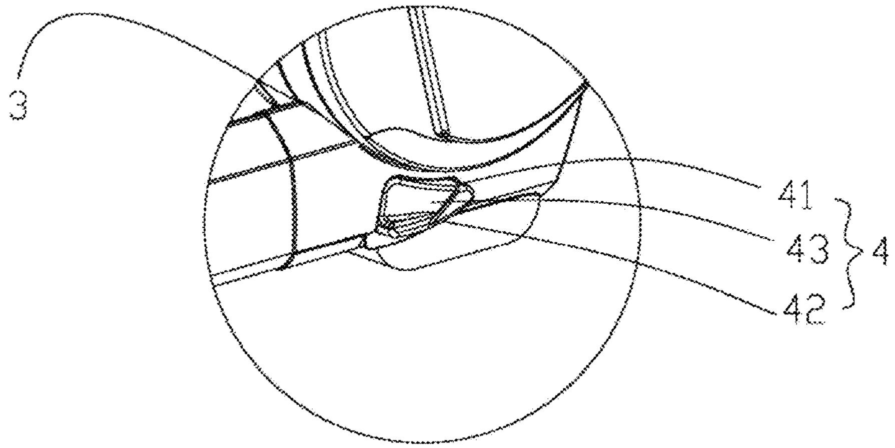
FIG. 3 is an enlarged view at M in FIG. 2.
Figure 4:
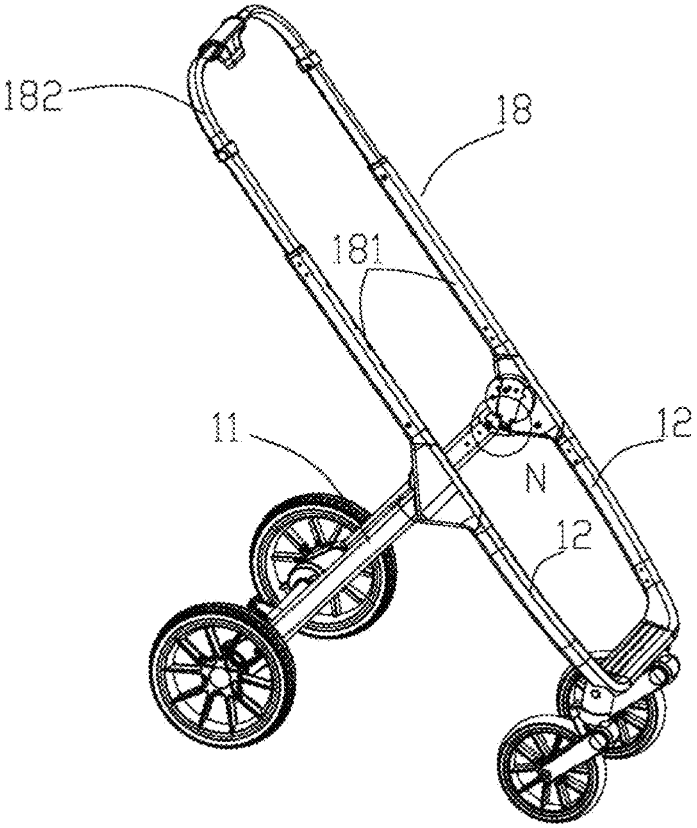
FIG. 4 is a perspective view of the invention with the seat assembly removed.
Figure 5:
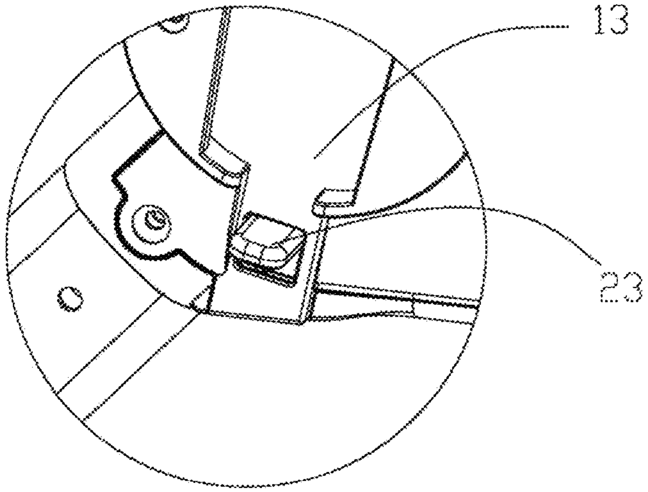
FIG. 5 is an enlarged view at N in FIG. 4.
Figure 11:
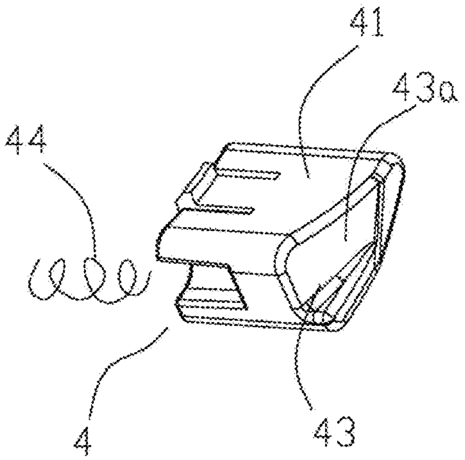
FIG. 11 is an exploded view III of components of the invention.
Figure 12:
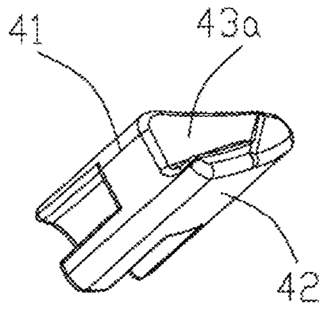
FIG. 12 is a perspective view of an unlocking part of the invention.

As shown in FIG. 3, FIG. 11 and FIG. 12, the unlocking part 4 includes a side projection 41 protruding from the side of the seat assembly 3, wherein the side projection 41 has a lower side 42 capable of pushing the protrusion 23 to disengage the latching part 22 from the latching position 21 when the seat assembly 3 is rotated and folded relative to the frame 1; and the side projection 41 is further provided with a avoiding part 43 for avoiding the protrusion 23 when the seat assembly 3 is rotationally unfolded relative to the frame 1. The provision of the avoiding part 43 enables the baby stroller to be unfolded without the seat assembly 3 rotating relative to the frame 1 being interfered by the protrusion 23, ensuring smooth unfolding. When the baby stroller is folded, during the rotation of the seat assembly 3, the lower side 42 of the side projection 41 presses the upper side of the protrusion 23 downwards, so that the protrusion 23 moves downwards, the latching part 22 is disengaged from the latching position 21, and the frame 1 is unlocked.

As shown in FIGS. 11 and 12, the side projection 41 is slidably connected to the seat assembly 3 so as to be able to move laterally with respect to the seat assembly 3; the avoiding part 43 is provided with a slope 43*a* on the side projection 41 and able to abut against and cooperate with a side end of the protrusion 23; and a reset element 44 is provided between the side projection 41 and the seat assembly 3 and able to be laterally compressed by the side projection 41 when the slope 43*a* abuts against the side of the protrusion 23. When the seat assembly 3 is rotated and unfolded relative to the frame 1, during the rotation of the seat assembly 3, the slope 43*a* contacts the side surface of the protrusion 23 and is pressed by the side surface of the protrusion 23, so that the side projection 41 slides with respect to the seat assembly 3. When the unlocking part 4 is disengaged from the protrusion 23, the reset element 44 pushes the side projection 41 to reset, so that the side projection 41 returns to a position where the latching part 22 can slide and be unlocked by pressing the protrusion 23 downwards again.

Figure 6:
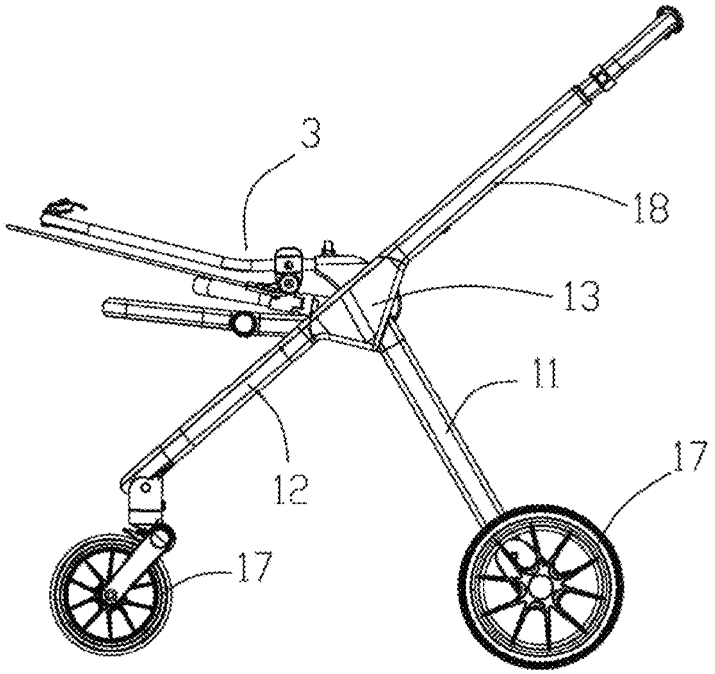
FIG. 6 is a side view I during the folding process of the invention.
Figure 7:
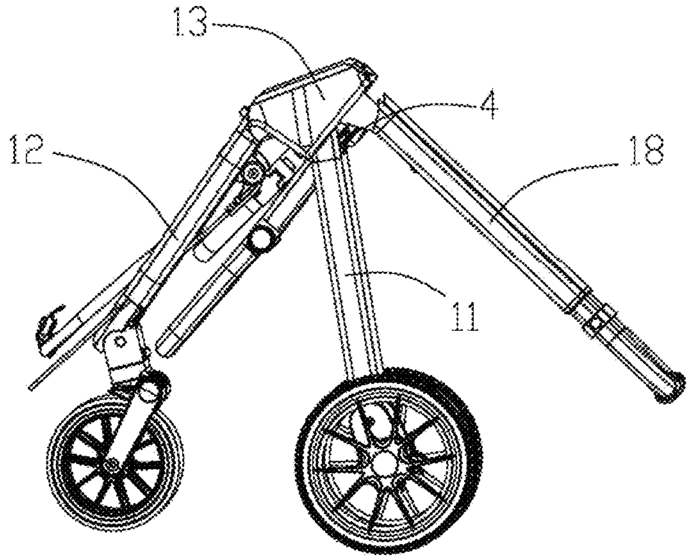
FIG. 7 is a side view II during the folding process of the invention.

As shown in FIG. 1, FIG. 6 and FIG. 7, the push rod assembly 18 includes a lower push rod 181 connected to the connecting seat 13; the lower push rod 181 is provided with a hand push rod 182 capable of sliding and being telescopic relative thereto; and the center of gravity of the push rod assembly 18 is set in a position where the push rod assembly 18 can automatically rotate relative to the first support leg 11 by means of the gravity of the push rod assembly 18 when the locking device 2 is unlocked.

When the locking device 2 is unlocked, the push rod assembly 18 can be automatically rotated with respect to the first support leg 11, and the second support leg 12 can be further rotated with respect to the first support leg 11 by pulling the traction rod 61. Therefore, as long as the locking device 2 is driven to be unlocked during the rotation of the seat assembly 3, the frame 1 can be automatically folded without applying an external force to the frame 1, so that the baby stroller is folded conveniently and quickly. In addition, when the baby stroller is folded, the wheels 17 and the upper end of the push rod assembly 18 may be supported on the ground to keep the folded stroller standing for storage.

The invention claimed is:

1. A baby stroller comprising a foldable frame, wherein the frame is provided with a locking device for locking the baby stroller in an unfolded state; the frame is connected with a seat assembly which is configured for a baby to sit when the baby stroller is in the unfolded state and is able to rotate relative to the frame and be closed and folded towards the frame when the baby stroller needs to be folded; and the seat assembly is provided with an unlocking part capable of driving the locking device to unlock when the seat assembly is rotated and folded relative to the frame; wherein the frame comprises a first support leg and a second support leg which have wheels and can rotate relative to each other, wherein a connecting seat is fixedly connected to an upper end of the first support leg; the second support leg is rotatably connected to the connecting seat about a first axis; the connecting seat is further rotatably connected to a push rod assembly which can rotate to unfold or close relative to the first support leg about a second axis; the push rod assembly and the second support leg are further provided with a traction component capable of pulling the second support leg to rotate and close to the first support leg when the locking device is unlocked and the push rod assembly is rotated and closed to the first support leg; the locking device comprises a latching position provided at a lower end of the push rod assembly or an upper end of the second support leg; the connecting seat is provided therein with a latching part capable of sliding therein and engaging with or disengaging from the latching position; the latching part is connected to a protrusion which is exposed on the connecting seat and can be pushed by the unlocking part when the seat assembly is rotated and closed relative to the frame; and a reset spring is further provided between the latching part and the connecting seat to push the latching part to slide and reset.

2. The baby stroller according to claim 1, wherein the traction component comprises a traction rod, the lower end of which is rotatably connected to the upper end of the second support leg about a third axis at a position offset from the first axis; and an upper end of the traction rod is rotatably connected to the lower end of the push rod assembly about a fourth axis at a position offset from the second axis.

3. The baby stroller according to claim 2, wherein the upper and lower ends of the traction rod are respectively provided with a protruding shaft; and the connecting seat is provided with a guide groove for the protruding shaft to pass through and control the movement track of the traction rod.

4. The baby stroller according to claim 2, wherein the lower end of the push rod assembly is of a plate-shaped structure; the upper end of the second support leg is of a plate-shaped structure; the connecting seat is provided with an upper slot for inserting the lower end of the push rod assembly; and the connecting seat is further provided with a lower slot for inserting the upper end of the second support leg.

5. The baby stroller according to claim 1, wherein the latching part is provided with a strip-shaped groove; the protrusion comprises a body which is provided with a protruding block exposed to the connecting seat; and the body is provided with a pin shaft which can move in the strip-shaped groove and can cooperate with a groove wall of the strip-shaped groove to push the latching part to slide.

6. The baby stroller according to claim 1, wherein an auxiliary device is further provided between the upper end of the second support leg and the connecting seat for assisting in pushing the second support leg to rotate and close to the first support leg when the frame is folded; the auxiliary device comprises an arc-shaped hole provided at the upper end of the second support leg; a sliding block capable of sliding therein is provided in the connecting seat; a pushing shaft protruding into the arc-shaped hole is provided on the sliding block; and a compression spring is provided between the sliding block and the connecting seat, which is compressed when the baby stroller is in the unfolded state and can push the sliding block and then push the second support leg to rotate via the push shaft after the locking device is unlocked.

7. The baby stroller according to claim 1, wherein the unlocking part comprises a side projection protruding from the side of the seat assembly, wherein the side projection has a lower side capable of pushing the protrusion to disengage the latching part from the latching position when the seat assembly is rotated and folded relative to the frame; and the side projection is further provided with a avoiding part for avoiding the protrusion when the seat assembly is rotationally unfolded relative to the frame.

8. The baby stroller according to claim 7, wherein the side projection is slidably connected to the seat assembly so as to be able to move laterally with respect to the seat assembly; the avoiding part is provided with a slope on the side projection and able to abut against and cooperate with a side end of the protrusion; and a reset element is provided between the side projection and the seat assembly and able to be laterally compressed by the side projection when the slope abuts against the side of the protrusion.

9. The baby stroller according to claim 1, wherein the push rod assembly comprises a lower push rod connected to the connecting seat; the lower push rod is provided with a hand push rod capable of sliding and being telescopic relative thereto; and the center of gravity of the push rod assembly is set in a position where the push rod assembly can automatically rotate relative to the first support leg by means of the gravity of the push rod assembly when the locking device is unlocked.

* * * * *